United States Patent
Kim

(10) Patent No.: US 7,149,551 B2
(45) Date of Patent: Dec. 12, 2006

(54) WIRELESS HEADSET CAPABLE OF AUTOMATIC LINK CONNECTION AND METHOD FOR CONTROLLING THE SAME

(75) Inventor: Dong-Woo Kim, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 307 days.

(21) Appl. No.: 10/024,980

(22) Filed: Dec. 19, 2001

(65) Prior Publication Data

US 2002/0111140 A1 Aug. 15, 2002

(30) Foreign Application Priority Data

Feb. 13, 2001 (KR) .................................. 2001-7018

(51) Int. Cl.
*H04M 1/00* (2006.01)
*H04M 9/00* (2006.01)
*H04B 7/00* (2006.01)
*H04R 1/10* (2006.01)
*H04R 25/00* (2006.01)

(52) U.S. Cl. .............................. 455/569.1; 455/575.2; 455/575.3; 455/41.2; 379/428.02; 379/430; 381/74; 381/384

(58) Field of Classification Search .............. 455/41.1, 455/41.2, 41.3, 569.1, 569.2, 575.1, 575.2, 455/575.3, 66.1, 74; 379/428.02, 430; 381/74, 381/384

See application file for complete search history.

(56) References Cited

U.S. PATENT DOCUMENTS

| 4,484,029 | A |   | 11/1984 | Kenney |
| 5,504,812 | A | * | 4/1996  | Vangarde .................... 379/430 |
| 5,978,689 | A | * | 11/1999 | Tuoriniemi et al. ....... 455/569.1 |
| 6,016,347 | A | * | 1/2000  | Magnasco et al. .......... 379/430 |
| 6,055,312 | A | * | 4/2000  | Pralus et al. ................ 379/430 |
| 6,373,942 | B1| * | 4/2002  | Braund ....................... 379/430 |
| 6,625,282 | B1| * | 9/2003  | Liang .................... 379/428.02 |
| 6,707,923 | B1| * | 3/2004  | Pronk ......................... 381/374 |
| 2002/0021800 | A1| * | 2/2002 | Bodley et al. .............. 379/430 |
| 2002/0067825 | A1| * | 6/2002 | Baranowski et al. ........ 379/430 |
| 2002/0071586 | A1| * | 6/2002 | Sung .......................... 381/371 |
| 2003/0119565 | A1| * | 6/2003 | Lin ............................. 455/569 |

FOREIGN PATENT DOCUMENTS

JP 2001-008274 1/2001

OTHER PUBLICATIONS

Specification of the Bluetooth System, Specification vol. 2, v1.0B Dec. 1, 1999 pp. 25-51.*

* cited by examiner

*Primary Examiner*—George Eng
*Assistant Examiner*—Un C. Cho
(74) *Attorney, Agent, or Firm*—The Farrell Law Firm

(57) ABSTRACT

A wireless headset includes a microphone supporting member having a microphone installed therein and being able to be folded to or unfolded from the main body of the wireless headset, and a sensing device connected to a connector of the microphone supporting member. The sensing device senses whether the microphone supporting member is folded or unfolded. If the microphone supporting member is unfolded, an attempt to register an ID (identification) of the wireless headset in a counterpart terminal and to connect a Bluetooth™ wireless communication link between the wireless headset and the counterpart terminal is performed using the Bluetooth™ module.

11 Claims, 4 Drawing Sheets

WIRELESS HEADSET CAPABLE OF AUTOMATIC LINK CONNECTION AND METHOD FOR CONTROLLING THE SAME

PRIORITY

This application claims priority to an application entitled "Wireless Headset Capable of Automatic Link Connection and Method for Controlling the Same" filed in the Korean Industrial Property Office on Feb. 13, 2001 and assigned Serial No. 2001-7018, the contents of which are hereby incorporated by reference.

BACKGROUND OF THE INVENTION

1. Field of the Invention

The present invention relates generally to an auxiliary communication terminal with a Bluetooth™ module, and in particular, to a wireless headset with a Bluetooth™ module and a link connection method for the wireless headset.

2. Description of the Related Art

Thanks to the development of wireless communication technology, a low-cost, low-powered wireless device has been developed for the wireless communication and computer industries. As part of the wireless communication technology, the Bluetooth™ protocol has been defined by Ericsson, Inc. The Bluetooth™ protocol aims at providing local wireless communication services to users, and was designed especially for the purpose of providing stable, efficient, low-cost and high-capacity voice/data networking.

Devices with a Bluetooth™ module, if they are located within a distance of about ten meters (10 m) from one another, can exchange voice/data signals with one another through a wireless link in real time. The devices with the Bluetooth™ module are divided into a master for transmitting voice/data signals and a plurality of slaves for receiving the voice/data signals transmitted from the master, and the roles of the master and the slaves can be exchanged according to circumstances. Since the Bluetooth™ module can be made in the form of a microchip, it can be easily attached to communication devices. In addition, the Bluetooth™ module operates in a 2.4 GHz frequency band, which is a worldwide compatible communication frequency band.

The Bluetooth™ protocol is now applied to various fields, such as a communication terminal, a computer peripheral device, household electric appliances and a wireless headset as well. All of the Bluetooth™ modules have unique IDs (Identifications), and in order to connect a master and a slave in a Bluetooth™ wireless communication link, an ID of the Bluetooth™ module of the slave should be registered in advance in the Bluetooth™ module of the master. Since a wireless headset usually plays the role of a slave device, an ID of the wireless headset should be registered in advance in its counterpart master Bluetooth™ wireless communication device, such as a mobile communication terminal, so as to form a Bluetooth™ wireless communication link between them. Conventionally, a wireless headset with the Bluetooth™ module has a function key for performing ID registration and link connection necessary for Bluetooth™ wireless communication, and a user will manually select the function key in order to register the ID of the wireless headset in its counterpart Bluetooth™ wireless communication terminal and to set up a wireless link for the Bluetooth™ wireless communication. As stated above, the conventional wireless headset is disadvantageous in that the user should manually initiate ID registration and wireless link connection necessary for the Bluetooth™ wireless communication.

SUMMARY OF THE INVENTION

It is, therefore, an object of the present invention to provide a wireless headset, and a link connection method therefor, capable of automatically performing ID registration and wireless link connection without separate user intervention.

To achieve the above object, there is provided a wireless headset comprising a microphone supporting means having a microphone installed therein and being able to be folded to or unfolded from the main body of the wireless headset; a sensing device connected to a connector of the microphone supporting means and sensing whether the microphone supporting means is folded or unfolded; and a controller connected to the sensing device and a Bluetooth™ module and registering, using the Bluetooth™ module, an ID (identification) of the wireless headset in a counterpart terminal and set a link between the wireless headset and the counterpart terminal if it is determined by the sensing device that the microphone supporting means is unfolded.

In addition, there is provided an automatic link connection method for a wireless headset comprising a Bluetooth™ module, a microphone supporting means having a microphone installed therein and being able to be folded to or unfolded from the main body of the wireless headset, and a sensing device connected to a connector of the microphone supporting means and sensing whether the microphone supporting means is folded or unfolded. The automatic link connection method comprises the steps of attempting, by the wireless headset, to register an ID (identification) of the wireless headset in a counterpart Bluetooth™ wireless communication terminal and to set a link between the wireless headset and the counterpart Bluetooth™ wireless communication terminal if the sensing device determines that the microphone supporting means is unfolded; and registering, by the counterpart Bluetooth™ wireless communication terminal, the ID of the wireless headset to set the link in response to the attempt of ID registration and link setting by the wireless headset.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
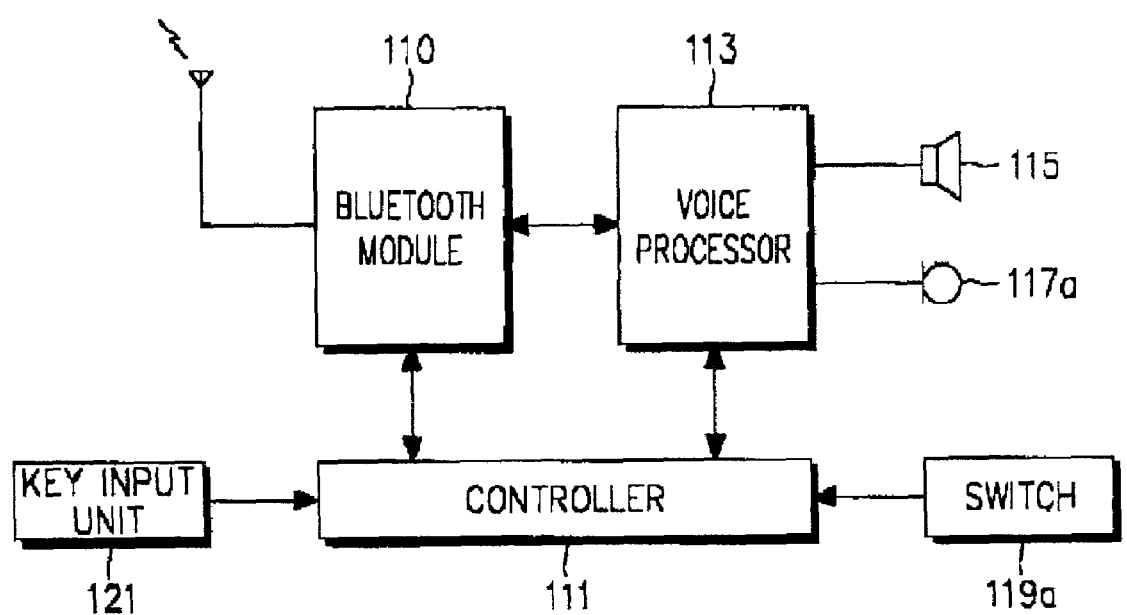
FIG. 1 is a block diagram of a wireless headset according to an embodiment of the present invention.
Figure 2:
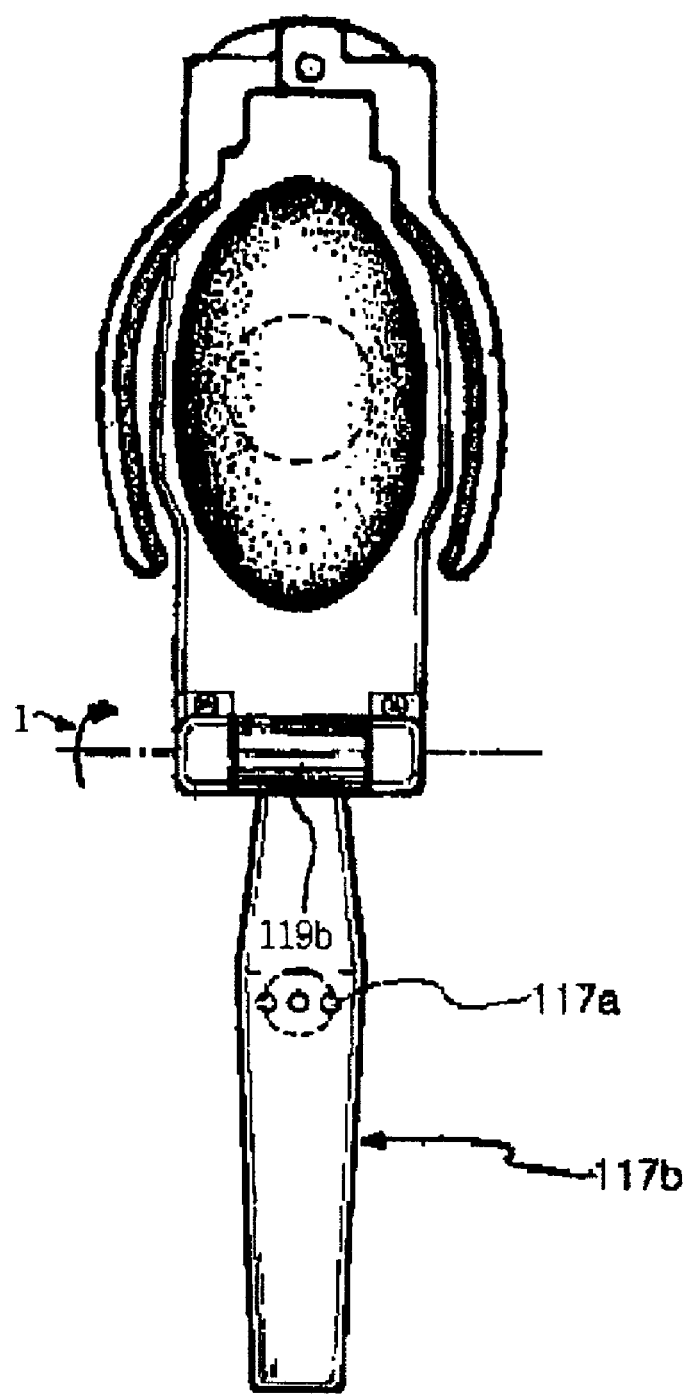
FIG. 2 is a side view of a wireless headset according to an embodiment of the present invention.

FIG. 1 is a block diagram of a wireless headset according to an embodiment of the present invention, and FIG. 2 shows a wireless headset according to an embodiment of the present invention. A structure of the wireless headset will now be described with reference to FIGS. 1 and 2.

Referring to FIG. 1, components of a wireless headset according to an embodiment of the present invention are shown which include a Bluetooth™ module 110, a controller 111, a voice processor 113, a switch 119a, a speaker 115, a microphone 117a and a key input unit 121. The controller 111 controls the overall operation of the wireless headset. The Bluetooth™ module 110 enables the wireless headset to communicate with other Bluetooth™ devices according to the Bluetooth™ protocol. The Bluetooth™ modules transmit and receive a control command, a response thereto and user data by exchanging message packets through a host control interface (HCI) defined between the Bluetooth™ modules. An RS232 interface, a USB interface, or a standard PC interface can, for example, be utilized to actually transmit an HCI packet. The HCI packet is classified into a command packet, an event packet and a data packet. The command packet provides about 60 command words for various utilizations of the Bluetooth™ module. Under the control of the controller 111, the voice processor 113 modulates a voice signal inputted through the microphone 117a into a transmissible (radio) signal and provides the modulated signal to the Bluetooth™ module 110; and demodulates a signal received from the Bluetooth™ module 110 into a voice signal and provides the demodulated voice signal to the speaker 115. The key input unit 121 provides key data inputted by the user to the controller 111.

The switch 119a connected to the controller 111 is turned on or off according to movement of a microphone supporting member on which the microphone 117a is mounted. In general, since the microphone supporting member is attached to the wireless headset in a hinge structure, the microphone supporting member is folded to the main body of the wireless headset when the wireless headset is not in use. Referring to FIG. 2, the switch 119a is situated in a hinge connector 119b to which a microphone supporting member 117b is connected, and is turned on or off according to the movement of the microphone supporting member 117b. Specifically, if the microphone supporting member 117b moving along an arrow (1) becomes folded, the switch 119a is turned off, and if the microphone supporting member 117b is unfolded, the switch 119a is turned on. The controller 111 monitors the on/off state of the switch 119a, and performs ID registration and link connection if the switch 119a is turned on.

Figure 3:
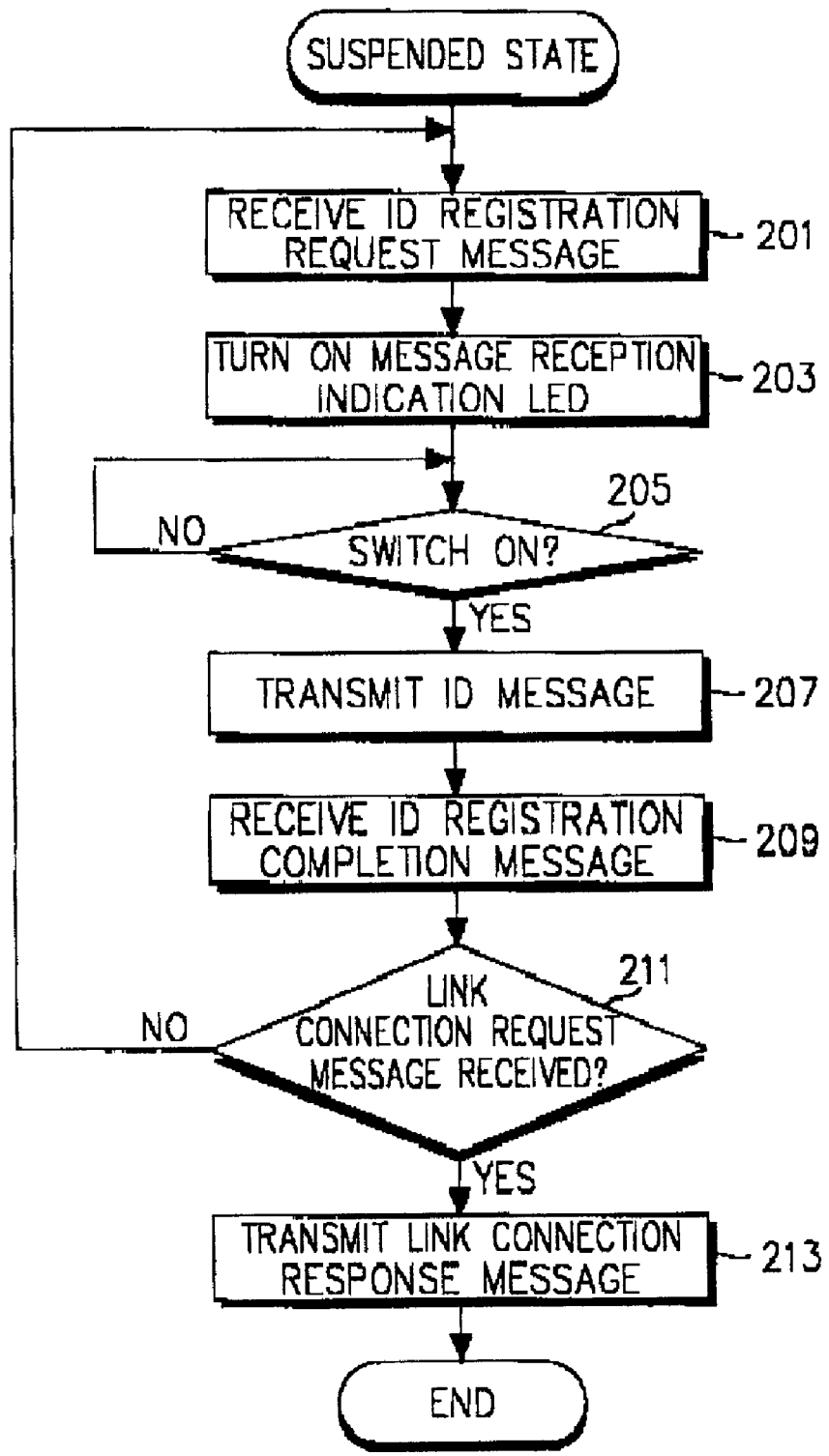
FIG. 3 is a flowchart illustrating an operation of a controller in a wireless headset according to an embodiment of the present invention.
Figure 4:
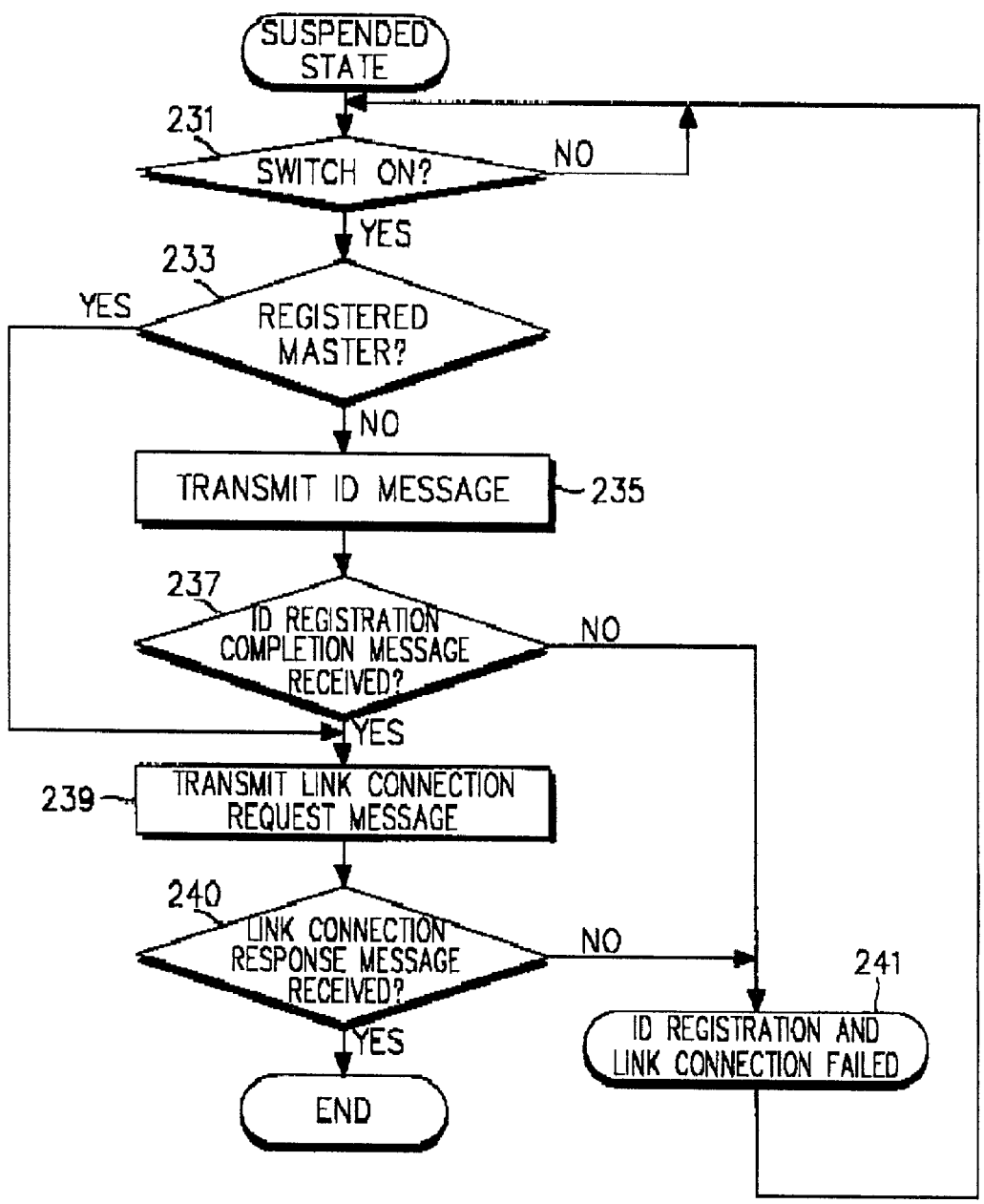
FIG. 4 is a flowchart illustrating an operation of a controller in a wireless headset according to another embodiment of the present invention.

With reference to FIGS. 3 and 4, a description will now be made of a procedure for performing automatic ID registration and link connection under the control of the controller 111 when the switch 119a is turned on (i.e., when the microphone supporting member 117b is unfolded). FIG. 3 is a flowchart illustrating an operation of the controller 111 in the wireless headset according to an embodiment of the present invention. Specifically, FIG. 3 illustrates a procedure for performing automatic ID registration and link connection at a request of a master terminal.

First, a master terminal (e.g., a mobile communication terminal) transmits an SCO (Synchronous Connection-Oriented link) signal for synchronization and a unique-ID registration request message to a slave terminal (e.g., a wireless headset), which has a Bluetooth™ module and is located within a coverage (service) area where Bluetooth™ wireless communication with the master terminal is available. Referring to FIG. 3, after being synchronized with the master terminal through the SCO signal, the wireless headset receives the unique-ID registration request message (Step 201). The controller 111 will alert a user, for example by turning on a message reception indication LED (Light Emitting Diode) (Step 203). In response to turn-on of the LED, the user will then unfold the microphone supporting member 117b. The controller 111 determines whether the switch 119a is turned on (Step 205). If the switch 119a is turned on as the microphone supporting member 117b is unfolded, the controller 111 transmits an ID message to the master terminal (Step 207). Upon receipt of the ID message, the master terminal registers an ID of the wireless headset and then transmits an ID registration completion message to the wireless headset. Here, the master terminal should be able to register an ID of the slave terminal (wireless headset). The controller 111 receives the ID registration completion message from the master terminal (Step 209) and then proceeds to step 211. The master terminal then transmits a link connection request message through an ACL (Asynchronous Connection-less Link) channel, as occasion demands. The controller 111 determines whether the link connection request message is received (Step 211). If the link connection request message is received, the controller 111 proceeds to step 213. If the link connection request message is not received, the controller 111 enters a suspended state. The controller 111 transmits to the master terminal a link connection response message responsive to the link connection request message to form a link between the master terminal and the wireless headset (Step 213). The link connection response message is typically issued, either by the master or slave device, to indicate that the device is in a waiting state and is substantially capable of engaging in communication.

To sum up, if the ID of the wireless headset is registered in the master terminal through steps 201 to 209, the master terminal monitors whether the wireless headset stays within a coverage where Bluetooth wireless communication with the master terminal is available. Then, upon reception of a link connection request (e.g., reception of an incoming call or reception of a link connection request from the user), the master terminal transmits a link connection request message to the wireless headset.

With reference to FIG. 4, a description will now be made of a procedure for connecting a Bluetooth™ wireless communication link at a request of the wireless headset according to another embodiment of the present invention. FIG. 4 is a flowchart illustrating an operation of the controller 111 in the wireless headset according to another embodiment of the present invention. The controller 111 determines whether the switch 119a is turned on (Step 231). If the switch 119a is turned on as the user unfolds the microphone supporting member 117b, the controller 111 determines whether a master terminal with which the wireless headset is registered is located within the coverage area where Bluetooth™ wireless communication with the wireless headset is available (Step 233). If the registered master terminal is located within the coverage area, the controller 111 proceeds to step 239. Otherwise, the controller 111 proceeds to step 235. The controller 111 transmits a link connection request message to the registered master terminal (Step 239). Thereafter, if a link connection response message is received from the registered master terminal, a Bluetooth™ wireless communication link is formed between the wireless headset and the registered master terminal. Otherwise, the Bluetooth™ wireless communication link fails to be connected (Step 241), returning to step 231.

However, if the registered master terminal is found to not be located within the coverage area in step 233, the controller 111 transmits an ID message to the master terminal (Step 235). If the master terminal can register the ID of the wireless headset, the master terminal registers the ID of the wireless headset using the ID message received from the wireless headset. The master terminal then transmits an ID registration completion message to the wireless headset. The controller 111 determines whether the ID registration completion message is received from the master terminal (Step 237). If the ID registration completion message is received, the controller 111 proceeds to step 239. Otherwise, the controller 111 proceeds to step 241 and fails to perform ID registration and link connection. The controller 111 transmits a link connection request message to the master terminal (Step 239). Thereafter, if a link connection response message is received from the master terminal, a Bluetooth™ wireless communication link is formed between the wireless headset and the master terminal. Otherwise, the Bluetooth™ wireless communication link fails to be connected (Step 241).

As described above, a wireless headset of the present invention can automatically perform ID registration and link connection without separate manipulation by the user, using a switch which determines the position of the connector of the microphone supporting member and turns on or off according to the movement of the microphone supporting member, and also using a controller that attempts to perform the ID registration and link connection when the switch is turned on as the microphone supporting member is unfolded.

While the invention has been shown and described with reference to a certain preferred embodiment thereof, it will be understood by those skilled in the art that various changes in form and details may be made therein without departing from the spirit and scope of the invention as defined by the appended claims. For example, the switch 119a, serving as a sensing device, can be replaced with an equivalent capable of sensing the movement of the microphone supporting member 117b. In addition, the present invention can also be applied to a wireless headset having a microphone supporting member connected to the headset by a sliding type of structure instead of the hinge structure.

What is claimed is:

1. A wireless headset with a wireless radio communication module, comprising:
   a microphone supporting member having a microphone installed;
   a connector located between the microphone supporting member and a main body of the wireless headset and coupled thereto to allow for displacement of the main body and microphone supporting member relative to one another between a folding and unfolding position;
   a sensing device located in the connector for automatically determining whether the microphone supporting member and a main body are displaced to one of the folding and unfolding positions; and
   a controller connected to the sensing device and the wireless radio communication module, the controller being operative, if the unfolding position is determined, to establish a link between the wireless headset and a master terminal registered in the wireless headset, by transmitting a link connection request message to the registered master terminal if the controller determines that the registered master terminal is located within a wireless communication coverage area, and by transmitting an ID (identification) message to the registered master terminal to prompt the registered master terminal to register the wireless headset, if the controller determines that the registered master terminal is not located within the wireless communication coverage area.

2. The wireless headset as claimed in claim 1, wherein the connector attaching the microphone supporting member to the main body of the wireless headset includes a hinge structure housing the sensing device.

3. A wireless headset with a wireless radio communication module, comprising:
   a microphone supporting member having a microphone installed therein and coupled to a main body of the wireless headset;
   a hinge structure located between and attached to the main body and microphone supporting member so that the main body and microphone supporting member are displaceable relative to one another between a folding and unfolding position;
   a sensing device located in the hinge structure for determining the unfolding position; and
   a controller connected to the sensing device and the wireless radio communication module for, if the unfolding position is determined, registering an ID (identification) of the wireless headset in a counterpart terminal through the wireless radio communication module, by transmitting a link connection request message to the counterpart terminal if the controller determines that the counterpart terminal is located within a wireless communication coverage area. and by transmitting an ID message to the counterpart terminal to prompt the counterpart terminal to register the wireless headset, if the controller determines that the counterpart terminal is not located within the wireless communication coverage area.

4. The wireless headset as claimed in claim 3, wherein the microphone supporting member is attached to the main body of the wireless headset in the hinge structure.

5. A wireless radio communication link automatic connection method for a wireless headset comprising a wireless radio communication module, a microphone supporting member having a microphone installed therein, a hinge structure located between and coupled to the microphone supporting member and a main body of the wireless headset so that the microphone supporting member is able to be folded or unfolded relative to the main body, sensing device mounted into the hinge structure for detecting whether the microphone supporting member is folded or unfolded, the method comprising the steps of:
   attempting, by the wireless headset, if the unfolded position is determined, to establish a link between the wireless headset and a master terminal registering therein an ID identification of the wireless headset, by transmitting a link connection request message to the registered master terminal if it is determined that the registered master terminal is located within a wireless communication coverage area, and by transmitting an ID message to the registered master terminal to prompt the registered master terminal to register the wireless headset, if it is determined that the registered master terminal is not located within the wireless communication coverage area.

6. A wireless radio communication link automatic connection method for a wireless headset comprising a wireless radio communication module, a microphone supporting member having a microphone installed therein, a hinge structure located between and coupled to the microphone supporting member and a main body of the wireless headset so that the microphone supporting member is able to be folded or unfolded relative to the main body, and a sensing device mounted to the hinge structure for sensing whether the microphone supporting member is folded or unfolded relative to the main body, the method comprising the steps of:

attempting, by the wireless headset, if the unfolded position is determined, to register an ID (identification) of the wireless headset in a counterpart terminal with a wireless radio communication module;

transmitting, by the wireless headset, an ID message to the counterpart terminal to prompt the counterpart terminal to register the wireless headset, if it is determined that the counterpart terminal is not located within the wireless communication coverage area; and registering, by the counterpart terminal, the ID of the wireless headset in the counterpart terminal in response to the ID message from the wireless headset.

7. A wireless radio communication link automatic connection method for a wireless headset comprising a wireless radio communication module, a microphone supporting member having a microphone installed therein, a hinge structure located between and coupled to the microphone supporting member and a main body of the wireless headset so that the microphone supporting member is able to be folded or unfolded relative to the main body, and a sensing device mounted to the hinge structure for sensing whether the microphone supporting member is folded or unfolded, the method comprising the steps of:

transmitting a link connection request message from the wireless headset through the wireless radio communication module to a master terminal registering therein an ID (identification) of the wireless headset, if the microphone supporting member is sensed to be unfolded and the registered master terminal is determined to be located within a wireless communication coverage area;

transmitting a link connection response message from the registered master terminal within the coverage area to the wireless headset in response to the link connection request message;

establishing a link between the wireless headset and the registered master terminal within the coverage area after the wireless headset receives the link connection response message; and transmitting, if the registered master terminal is determined to be located outside of the wireless communication coverage area, an ID (identification) message to the registered master terminal outside the coverage area to prompt the registered master terminal outside the coverage area to register the wireless headset.

8. A wireless radio communication link automatic connection method for a wireless headset comprising a wireless radio communication module, a microphone supporting member having a microphone installed therein, a hinge structure located between and coupled to the microphone supporting member and a main body of the wireless headset so that the microphone supporting member is able to be folded or unfolded relative to the main body, and a sensing device electrically connected to and located in the hinge structure for sensing whether the microphone supporting member is folded or unfolded, the method comprising the steps of:

receiving a link connection request message from a master terminal registering therein an ID (identification) of the wireless headset; and transmitting a link connection response message to the master terminal if the microphone supporting member is sensed to be- unfolded, and the registered master terminal is determined to be located within a wireless communication coverage area; and transmitting an ID message to the registered master terminal to prompt the registered master terminal to register the wireless headset, if the controller determines that the registered master terminal is not located within the wireless communication coverage area.

9. A wireless radio communication link automatic connection method for a wireless headset comprising a wireless radio communication module, a microphone supporting member having a microphone installed therein, a hinge structure located between and coupled to the microphone supporting member and a main body of the wireless headset so that the microphone supporting member is able to be folded or unfolded relative to the main body, and a sensing device mounted to the hinge structure for sensing whether the microphone supporting member is folded or unfolded, the method comprising the steps of:

transmitting an ID (identification) message of the wireless headset from the wireless headset to a counterpart wireless radio communication terminal if the microphone supporting member is sensed to be unfolded and the counterpart wireless radio communication terminal is determined to be located within a wireless communication coverage area;

registering, by the counterpart wireless radio communication terminal located within the coverage area, an ID of the wireless headset in the counterpart wireless radio communication terminal located within the coverage area in response to the ID message and transmitting an ID registration completion message to the wireless headset; and transmitting, if the counterpart wireless radio communication terminal is determined to be located outside of the wireless communication coverage area, an ID message to the counterpart wireless radio communication terminal outside of the coverage area to prompt the counterpart wireless radio communication terminal outside of the coverage area to register the wireless headset.

10. The method as claimed in claim 9, further comprising the steps of: transmitting, if the counterpart wireless radio communication terminal is determined to be located within a wireless communication coverage area, a link connection request message from the wireless headset to the counterpart wireless radio communication wireless communication terminal; and connecting a link between the wireless headset and the counterpart wireless radio communication wireless communication terminal by transmitting a link connection response message from the counterpart wireless radio communication wireless communication terminal to the wireless headset in response to the link connection request message.

11. A wireless headset for local wireless master/slave communication, comprising:

a microphone supporting member having a microphone installed therein and;

a hinge structure located between and attached to the main body and microphone supporting member so that the main body and microphone supporting member are displaceable relative to one another between a folding and unfolding position;

a sensing device mounted to the hinge structure for determining whether the microphone supporting member and the main body are in the folded or unfolded positions; and a controller connected to the sensing device, for connecting, if the unfolded position is determined, a link between the wireless headset and a master terminal registered in the wireless headset, by transmitting a link connection request message to the registered master terminal if the controller determines that the registered master terminal is located within a wireless communication coverage area, and by transmitting an ID (identification) message to the registered master terminal to prompt the registered master terminal to register the wireless headset, if the controller determines that the registered master terminal is not located within the wireless communication coverage area.

* * * * *